(12) United States Patent
Wong (10) Patent No.: US 6,375,107 B1
(45) Date of Patent: Apr. 23, 2002

(54) SPINCAST FISHING REEL

(75) Inventor: Kwok Yin Wong, Hong Kong (CN)

(73) Assignee: Shakespeare Company, Columbia, SC (US)

( * ) Notice: Subject to any disclaimer, the term of this patent is extended or adjusted under 35 U.S.C. 154(b) by 0 days.

(21) Appl. No.: 09/553,778

(22) Filed: Apr. 21, 2000

(51) Int. Cl.$^7$ .............................................. A01K 89/01
(52) U.S. Cl. ...................... 242/240; 242/311; 242/319
(58) Field of Search ................................ 242/240, 311, 242/319

(56) References Cited

U.S. PATENT DOCUMENTS

| | | | |
|---|---|---|---|
| 2,862,679 A | | 12/1958 | Denison et al. |
| 3,074,664 A | * | 1/1963 | Beger ........................ 242/240 |
| 3,114,514 A | * | 12/1963 | Clark ........................ 242/240 |
| 3,152,771 A | | 10/1964 | Maury et al. |
| 3,154,264 A | * | 10/1964 | Johnson ...................... 242/240 |
| 3,255,980 A | | 6/1966 | Ueno |
| 3,259,333 A | | 7/1966 | Hull |
| 3,381,914 A | * | 5/1968 | Taggart ...................... 242/311 |
| 3,469,799 A | | 9/1969 | Hull |
| 3,481,554 A | | 12/1969 | Hull |
| 3,794,264 A | * | 2/1974 | Hull ........................... 242/240 |
| 3,836,092 A | | 9/1974 | Hull |
| 3,970,263 A | | 7/1976 | Hull |
| 4,331,303 A | * | 5/1982 | Moss .......................... 242/311 |
| 4,359,196 A | | 11/1982 | Puryear |
| 4,474,341 A | | 10/1984 | Shackelford et al. |
| 4,961,547 A | * | 10/1990 | Peterson et al. ............ 242/311 |
| 5,149,010 A | | 9/1992 | Bacher |
| 5,377,924 A | * | 1/1995 | Takeuchi ..................... 242/311 |
| 5,427,325 A | | 6/1995 | Weaver |
| D404,109 S | | 1/1999 | Zwayer et al. |
| 5,924,639 A | | 7/1999 | Atherton |

* cited by examiner

Primary Examiner—Katherine A. Matecki
(74) Attorney, Agent, or Firm—Nelson Mullins Riley & Scarborough (57) ABSTRACT

A spincast fishing reel has a reel frame to which front and rear covers are attached. The rear cover includes a pivotable thumb button which is depressed by a user when fishing line is to be cast. The front cover closes the face of the reel, but defines a forward opening through which the fishing line extends. A normally nonrotatable line spool is located inside of the front cover on a mounting hub of the reel frame. Fishing line is wound onto the line spool by a rotatable pickup head located forward of the line spool. An annular shroud element at least partially covers the outer circumferential surface of the pickup head when fishing line is being wound. As a result, the fishing line will travel between the pickup head and the inside surface of the shroud element to facilitate engagement thereof by the pickup head.

19 Claims, 8 Drawing Sheets

SPINCAST FISHING REEL

BACKGROUND OF THE INVENTION

The present invention relates to the art of fishing reels. More particularly, the invention relates to closed faced fishing reels commonly known as spincast reels.

Spincast fishing reels typically have a central body, or "reel frame," to which front and rear covers are attached. The reel frame includes a spool hub supporting a line spool on which the fishing line is wound. The line spool is normally stationary, but controllably rotatable in response to tension placed on the fishing line. A pickup head, mounted forward of the spool, winds the fishing line around the spool when rotated by a crank handle. Typically, the pickup head will be configured having pickup slots or selectively retractable pickup pins to engage the line as the pickup head is being rotated.

The front cover of a spincast reel is configured to surround and cover both the line spool and the pickup head. The line itself extends over the pickup head from the spool, traversing between the pickup head and the inner surface of the front cover. The line exits through a central opening at the forward end of the front cover.

Spincast reels of the prior art have often been constructed such that the front cover will "bend" the line path into a position where the line can be engaged by the pickup head. Even with such an arrangement, however, the line may become disengaged from the pickup head. When this occasionally occurs, the user will experience line slippage during the winding process. Thus, while prior art approaches have worked reasonably well, further room for improvement exists in the art.

SUMMARY OF THE INVENTION

The present invention recognizes and addresses the foregoing considerations, and others, of prior art constructions and methods.

Accordingly, it is an object of the present invention to provide a novel fishing reel.

It is a more particular object of the present invention to provide a novel construction for a spincast fishing reel.

It is further object of the present invention to provide a spincast fishing reel constructed to facilitate line pickup by the rotating pickup head.

Some of these objects are achieved by a spincast fishing reel comprising a reel frame including a spool support portion. A normally nonrotatable line spool is mounted on the spool support portion of the reel frame. A pickup head is rotatable with respect to the line spool such that rotation of the pickup head will cause fishing line to be wound onto the line spool. A closed-face cover, connected to the reel frame, encloses the line spool and the pickup head. The cover includes a forward opening therein through which the fishing line extends.

The reel frame of the spincast reel further includes an annular shroud element located inside of the cover. The annular shroud element surrounds the line spool and has an inner diameter no less than an outer diameter of the pickup head to facilitate engagement of the fishing line by the pickup head.

In some exemplary embodiments, the annular shroud element may comprise a detachable component of the reel frame. Where the annular shroud element is constructed as a detachable element, the reel frame preferably includes a securing mechanism by which the annular shroud element is detachably connected. For example, the securing mechanism may comprise at least one lug and slot combination.

Often, the annular shroud element may be configured to allow viewing of the fishing line on the line spool. For example, the annular shroud element may be at least partially transparent.

The pickup head may be of a type having at least one pickup pin to engage the fishing line. In some such embodiments, a forward edge of the annular shroud element may be located axially adjacent to the pickup pin when fishing line is being wound onto the line spool. In addition, the annular shroud element may be configured in some embodiments such that an inner diameter thereof at the shroud's forward edge will be no greater than the radial extent of the pickup pin.

Typically, the pickup head will be rotationally actuated by rotation of a manual crank handle. In general, the reel frame will often include an attachment foot for attaching the reel to a fishing rod.

Other objects of the present invention are achieved by a spincast fishing reel comprising a normally nonrotatable line spool. A pickup head, axially and rotatably movable with respect to the line spool, includes at least one pickup pin. A crank handle is operatively associated with the pickup head such that manual rotation thereof will cause rotation of the pickup head. The reel further includes an annular shroud element at least partially surrounding an outer circumferential surface of the pickup head when fishing line is being wound onto the line spool. As a result, the fishing line will travel between the pickup head and the shroud element to facilitate engagement by the pickup head.

In many embodiments, a forward edge of the annular shroud element may be located axially adjacent to the pickup pin when fishing line is being wound onto the line spool. In addition, the annular shroud element may be configured such that an inner diameter thereof at the forward edge will be no greater than the radial extent of the pickup pin.

Still further objects of the present invention are achieved by a spincast fishing reel comprising a reel frame defining a generally circular frame wall. The reel frame includes a spool support hub for mounting a line spool containing fishing line in a normally nonrotatable fashion. A pickup head, axially and rotatably movable with respect to the line spool, includes at least one pickup pin. A crank handle is operatively associated with the pickup head such that manual rotation of the crank handle causes rotation of the pickup head.

In this case, the reel further includes an annular shroud element configured having an inner diameter at a forward edge thereof no greater than a radial extent of the pickup pin. As a result, fishing line will travel between the pickup head and the shroud element when it is being wound onto the line spool.

In addition, the reel includes a closed-face cover which is connected to the reel frame to enclose the line spool and the pickup head. The cover includes a forward opening therein through which the fishing line extends. A rear cover, having a pivotal thumb button mounted thereon, is also connected to the reel frame. The thumb button is actuatable to allow casting of the fishing line.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying drawings, in which.

Repeat use of reference characters in the present specification and drawings is intended to represent same or analogous features or elements of the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention.

Figure 1:
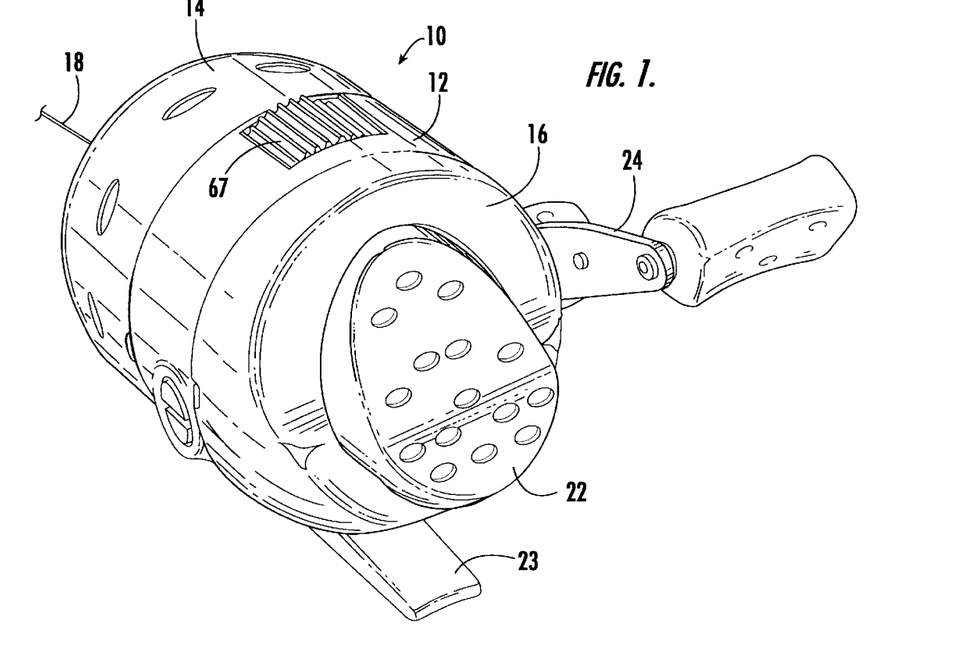
FIG. 1 is a rear perspective view of a spincast fishing reel constructed in accordance with the present invention.
Figure 2:
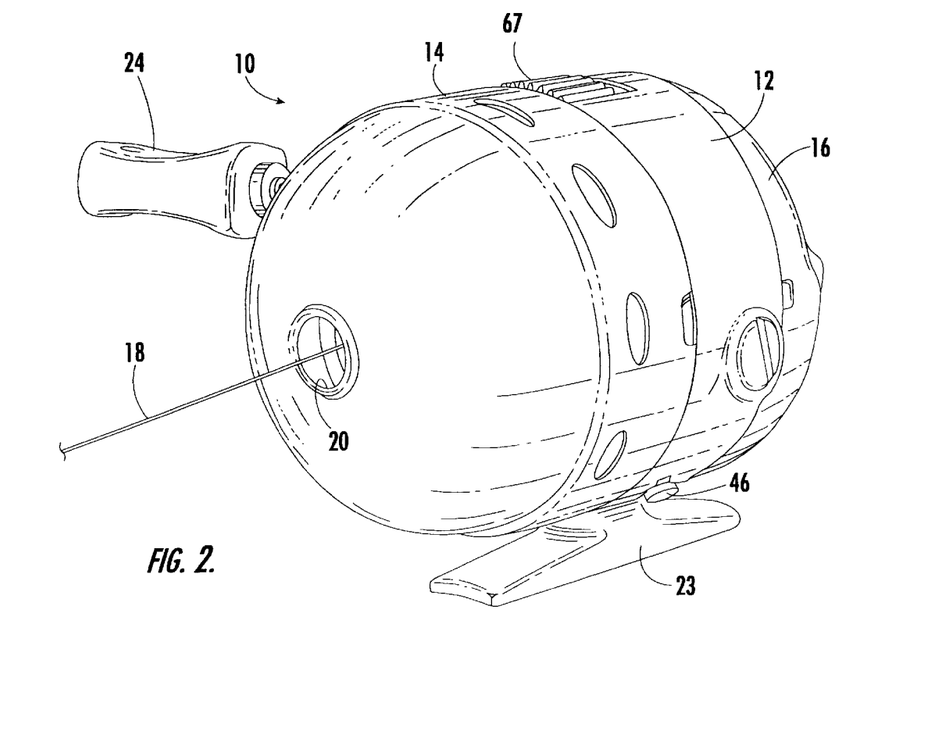
FIG. 2 is a front perspective view of the reel shown in FIG. 1.

FIGS. 1 and 2 illustrate an improved spincast reel 10 constructed in accordance with the present invention. Reel 10 includes a reel frame 12 to which a front cover 14 and a rear cover 16 are detachably connected. Fishing line 18 extends through a forward opening 20 defined in front cover 14. In addition, a pivotable thumb button 22 is carried by rear cover 16. A user depresses thumb button 22 to allow casting of fishing line 18 in a well-known manner. Preferably, reel frame 12 includes an attachment foot 23 to permit the reel to be mounted to a fishing rod.

Figure 3:
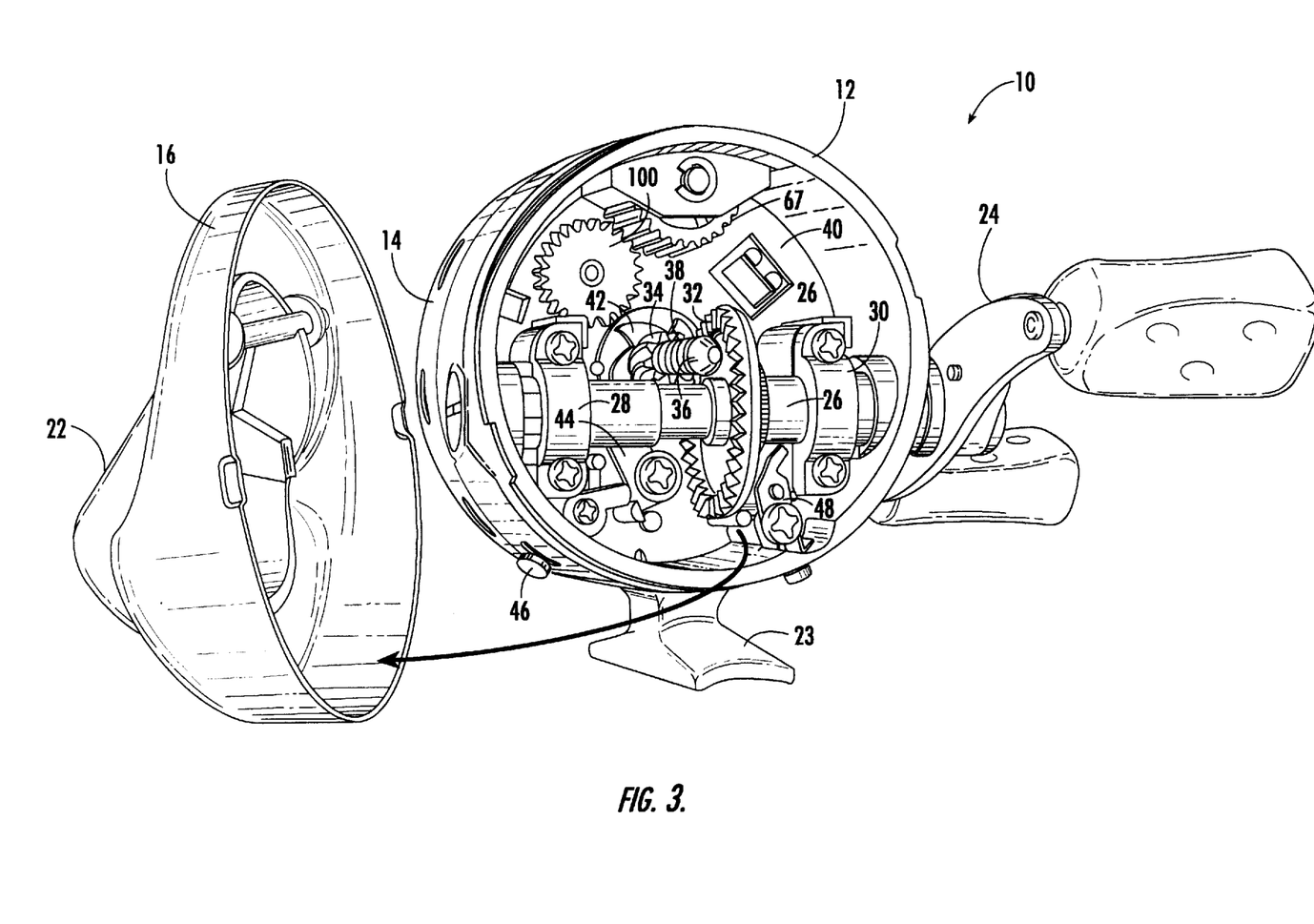
FIG. 3 is a rear view of the reel shown in FIG. 1, with the rear cover detached to reveal various internal components thereof.

A crank handle 24 is rotated by a user when it is desired to wind fishing line 18 back in. As shown in FIG. 3, crank handle 24 is attached to the end of a transverse shaft 26 supported for rotation by bushings 28 and 30. A bevel gear 32, carried by shaft 26, engages a pinion 34. Rotation of pinion 34 causes simultaneous rotation of a main shaft 36 extending therethrough.

Main shaft 36 is axially movable with respect to pinion 34, but is normally urged in an axially rearward direction by a helical spring 38. The end of main shaft 36 is pushed forward when thumb button 22 is depressed, thus permitting the fishing line to be cast.

Pinion 34 is supported for rotation by a circular frame wall 40, which generally divides the enclosure of reel 10 into front and rear compartments. A ratchet wheel 42 is located at the base of pinion 34 for engaging a pawl member 44. Wheel 42 and pawl member 44 form an anti-reverse ratchet mechanism which prevents undesired rotation of main shaft 36 in the counterclockwise direction. The anti-reverse mechanism, however, may be selectively disengaged via lever 46. The illustrated embodiment further includes a bait click mechanism 48 which may also be engaged or disengaged at the option of the user.

Figure 4:
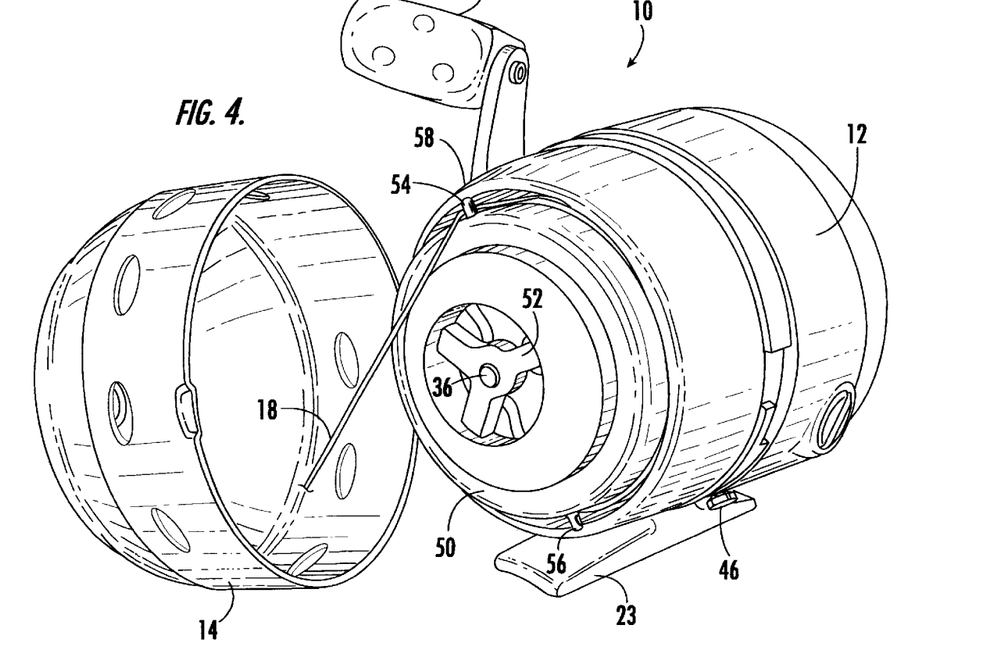
FIG. 4 is a front perspective view of the reel shown in FIG. 1, with the front cover detached to reveal the line pickup head and annular shroud element located thereabout.

Front cover 14 is detached in FIG. 4 to illustrate various components located within the front compartment of reel 10. As shown, a pickup head 50 includes a suitable nut element 52 for attachment to a threaded end of main shaft 36. Rotation of crank handle 24 thus causes a concomitant rotation of pickup head 50.

In this case, pickup head 50 is constructed having a pair of diametrically opposed pickup pins 54 and 56. As will be explained more fully below, pickup pins 54 and 56 are retracted into pickup head 50 during casting of fishing line 18. When fishing line 18 is being retrieved, however, pickup pins 54 and 56 are extended (as shown) to engage the line.

Figure 5:
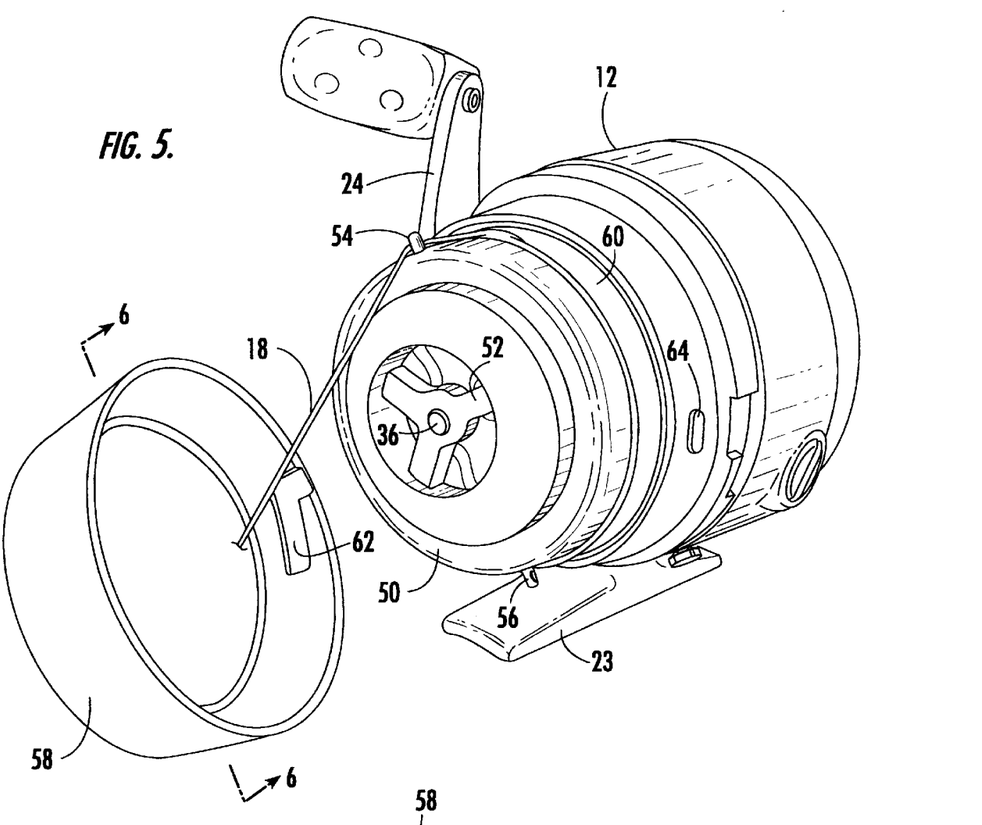
FIG. 5 is a view similar to FIG. 4, with the annular shroud element detached.
Figure 6:
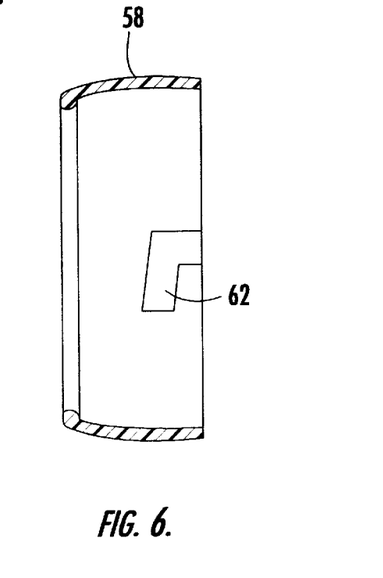
FIG. 6 is a cross-sectional view of the annular shroud element taken along line 6—6 of FIG. 5.

Referring now to FIGS. 5 and 6, reel frame 12 includes an annular shroud element 58 at least partially surrounding an outer circumferential surface of pickup head 50 when fishing line 18 is being retrieved. Thus, shroud element 58 serves to effectively trap line 18 into engagement with one of the pickup pins as head 50 is rotated. In this manner, the line is easily and repeatedly engaged by the pickup pins as it is wound onto line spool 60.

While shroud element 58 may be a unitary extension of frame 12, it is configured as a detachable component in the illustrated embodiment. In this case, shroud element 58 defines suitable slots, such as slot 62, for engaging lugs located on the main portion of reel frame 12, such as lug 64. It should be appreciated, however, that other suitable means of attaching shroud element 58, such as screws, adhesives, or snap fits, may also be used.

In some exemplary embodiments, shroud element 58 may be constructed of a suitable transparent material, such as a glass and mineral reinforced nylon. As a result, the user will be able to see how much line is left on line spool 60 without removing shroud element 58.

Figure 7:
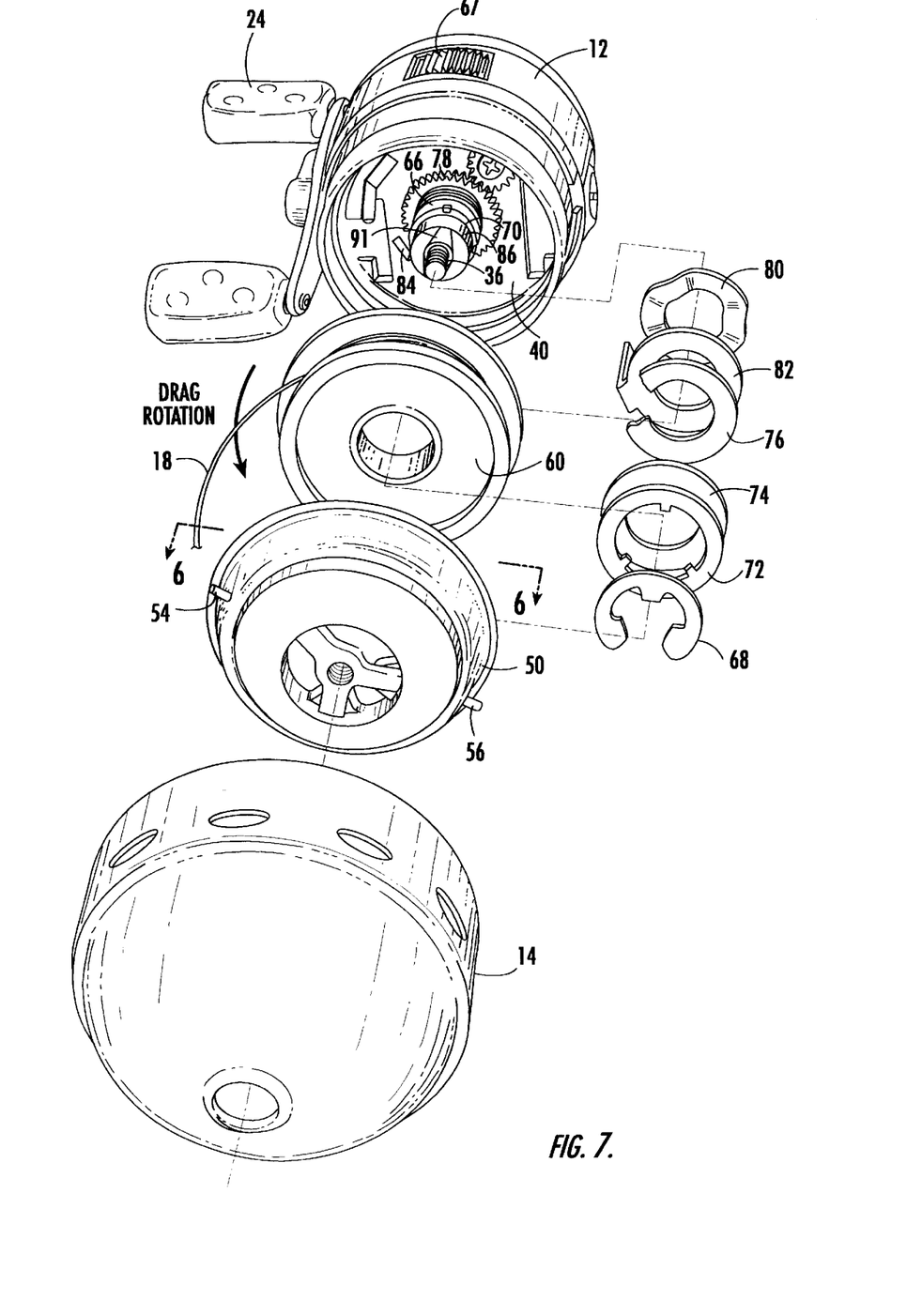
FIG. 7 is a partially exploded view of the reel shown in FIG. 1.

Referring now to FIG. 7, line spool 60 is mounted on a cylindrical hub 66 integrally extending from frame wall 40. Line spool 60 is normally non-rotatable when mounted on hub 66, but may undergo limited rotary slippage under line tension. The force required to produce such slippage is controlled by the reel's drag mechanism. The drag force may be adjusted by a thumb wheel 67 projecting through a slot in the outer surface of reel frame 12.

Line spool 60 is retained in position by a retaining clip 68 received in a slot 70 defined in hub 66. In the illustrated embodiment, a keyed washer 72 and a drag washer 74 are located between retaining clip 68 and the front face of line spool 60. The back face of line spool 60 is similarly engaged by a drag washer 76. In addition, a gear nut 78 is located on a threaded base portion of hub 66. A spring washer 80 and a tanged washer 82 are located between gear nut 78 and drag washer 76. The tang of washer 82 is received in a slot 84 defined in frame wall 40.

The forward portion 86 of hub 66 defines a cylindrical surface which forces pickup pins 54 and 56 into their extended positions. This can be explained with reference to FIG. 8, where it can be seen that pickup pins 54 and 56 are attached to respective followers 88 and 90. Followers 88 and 90 ride upon the outer surface of forward portion 86 when line 18 is being retrieved.

Figure 8:
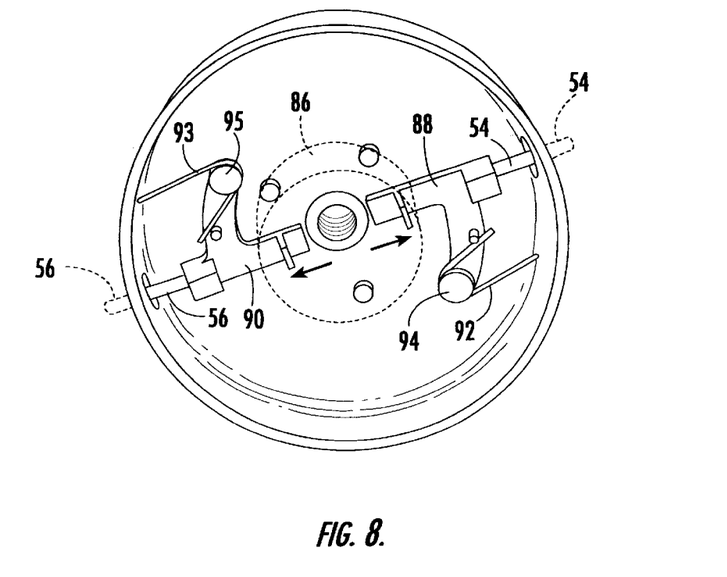
FIG. 8 is a rear view of the pickup head showing the manner in which the retractable pickup pins operate.

During casting, pickup head 50 is moved axially forward such that followers 88 and 90 are located ahead of the hub's forward portion 86. Respective springs 92 and 93 urge followers 88 and 90 inward, thus retracting pickup pins 54 and 56. In other words, springs 92 and 93 cause followers 88 and 90 to pivot about respective pivot points 94 and 95, thereby pulling pickup pins 54 and 56 through slots in the outer surface of pickup head 50.

After casting, the user rotates crank handle 24, which causes pickup head 50 to also rotate. In this case, a relatively shallow cam surface 91 is located on the front of hub 66 to facilitate the outward movement of followers 88 and 90. When followers 88 and 90 are moved outward in this manner, the force of spring 38 causes shaft 36 to move in a rearward axial direction. Pickup head 50 is then positioned to wind the fishing line onto spool 60.

Figure 9:
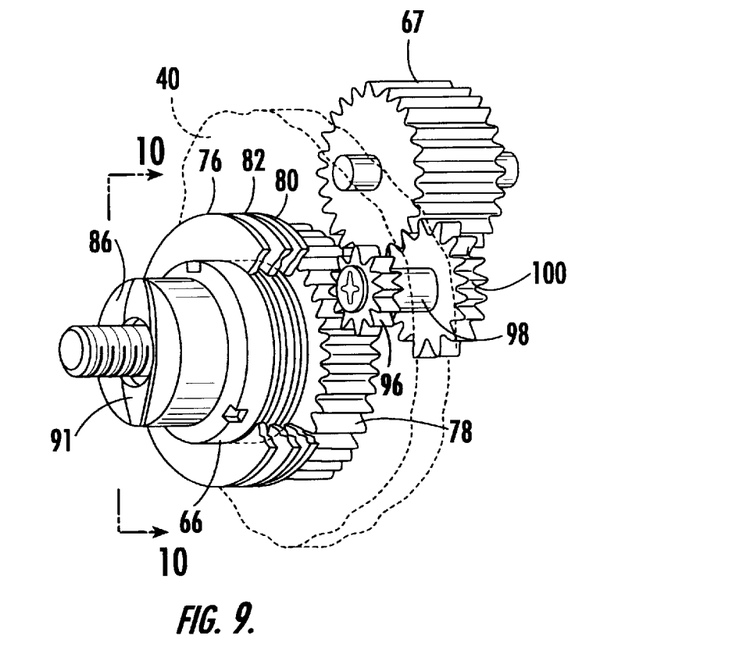
FIG. 9 is an enlarged perspective view of a preferred gear drag arrangement utilized in the reel shown in FIG. 1.
Figure 10:
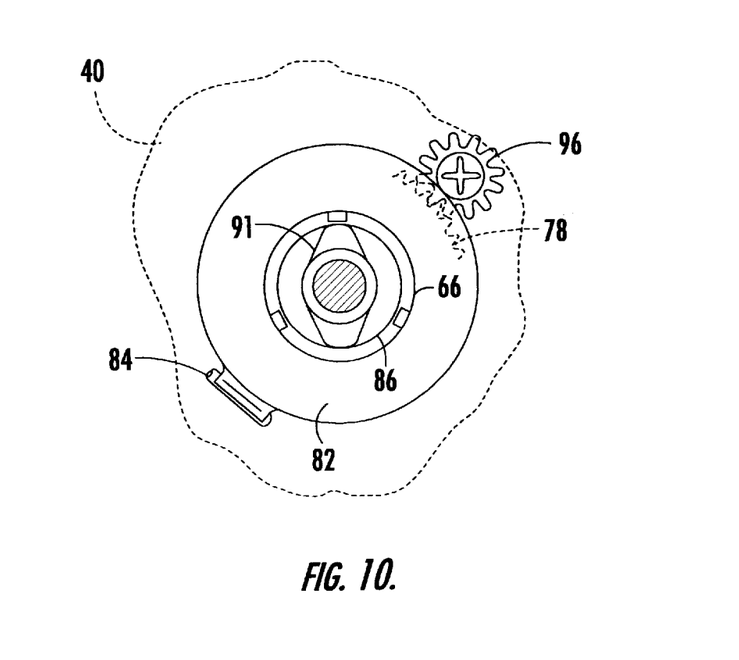
FIG. 10 is an end view taken along line 10—10 of FIG. 9.

Referring now to FIGS. 9 and 10, it can be seen that gear nut 78 is engaged by a smaller gear 96. Gear 96 is, in turn, located at one end of a shaft 98 extending through frame wall 40. The other end of shaft 98 carries a gear 100 engaging the outer surface of thumb wheel 67. It can thus be seen that rotation of thumb wheel 67 by a user will cause a resulting rotation of gear nut 78.

As gear nut 78 rotates, the helical threads on its inside surface will cause it to move axially along the threaded portion of hub 66. It will be appreciated that the direction of axial movement will depend upon the direction of rotation.

Figure 11:
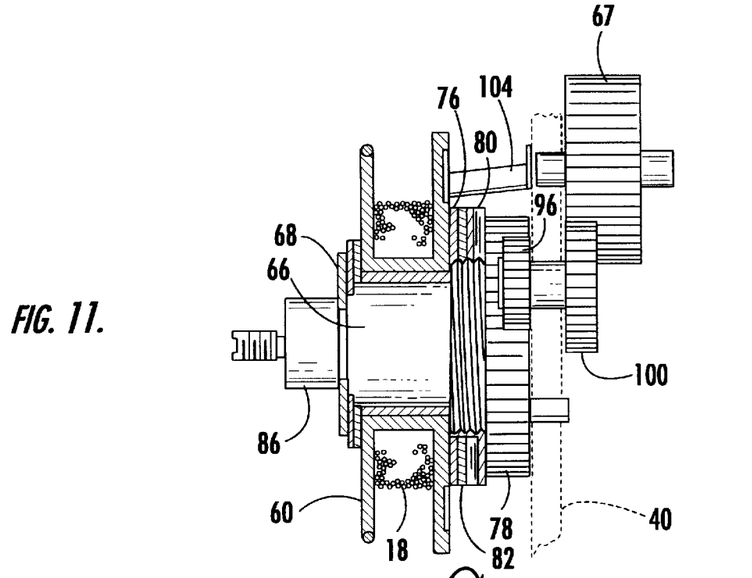
FIG. 11 is a partial cross-sectional view showing the gear drag arrangement of FIG. 9.
Figure 12:
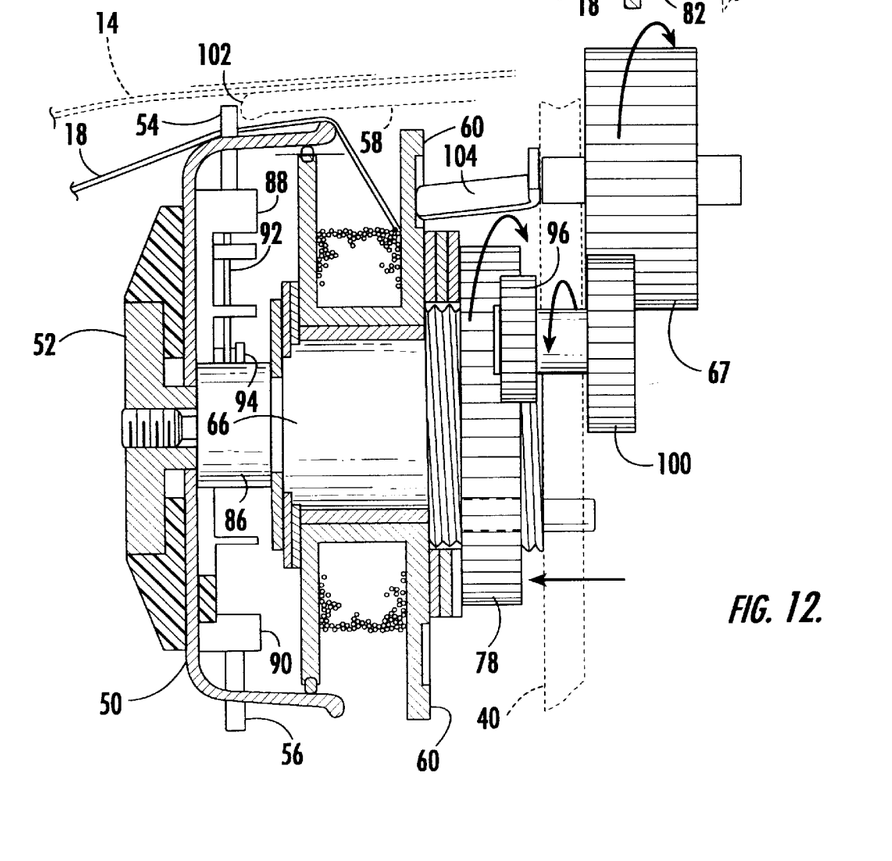
FIG. 12 is a cross-sectional view similar to FIG. 11 showing various additional details.

The operation of the drag mechanism can be more fully explained with reference to FIGS. 11 and 12. In FIG. 11, gear nut 78 is located against wall 40 to impose minimum drag force on line spool 60. In FIG. 12, however, thumb wheel 67 is being rotated in a clockwise direction, which results in a clockwise rotation of gear nut 78. This causes compression of spring washer 80, forcing drag washers 74 and 76 against the respective sides of line spool 60. In other words, the force applied by gear nut 78 pinches the line spool between drag washers 74 and 76, causing a frictional resistance to rotation of spool 60 around hub 66.

In contrast with prior art arrangements, gear nut 78 applies the drag force evenly over the face of spool 68, rather than at one point. In addition, there is a slight mechanical advantage created by the gears that is not present in many prior art arrangements. One preferred embodiment of reel 10 uses a gear ratio of 0.725:1 (i.e., one turn of thumb wheel 67 results in 0.725 turns of gear nut 78).

It will be appreciated that the axial distance moved by gear nut 78 is controlled by the pitch of the thread on its inner diameter. A greater pitch will yield a greater axial distance moved per rotation of thumb wheel 67. This produces a shorter range of the drag from the highest to the lowest setting. Spring washer 80 provides a comfortable resistance to tightening the thumb wheel, and helps to maintain the position of the drag while the reel is being used.

Certain additional aspects of reel 10 can also be easily explained with reference to FIG. 12. In this case, for example, it can be seen that a forward edge 102 of shroud element 58 is located axially adjacent to pickup pins 54 and 56 when pickup head 50 is positioned for line retrieval. In such embodiments, the inner diameter of shroud element 58 at forward edge 102 may preferably be equal to or less than the radial extent of the pickup pins. Alternatively, shroud element 58 may be configured to extend over pickup pins 54 and 56. An annular lip having an inner diameter less than the radial extent of the extended pickup pins may be defined on the inside surface of shroud element 58 in such embodiments. The lip would preferably be located axially adjacent to the pickup pins on the side closest to frame wall 40.

A clip feature may also be integrated into the system so that there is an audible indication when line spool 60 is being rotated against the drag force. In this case, the audible indication is provided by a tab 104 mounted to frame wall 40. Tab 104, which may be made from a suitable plastic or metal, engages an irregular surface defined on the back side of spool 60. As spool 60 rotates, tab 104 flexes to produce the desired clicking noise.

Figure 13:
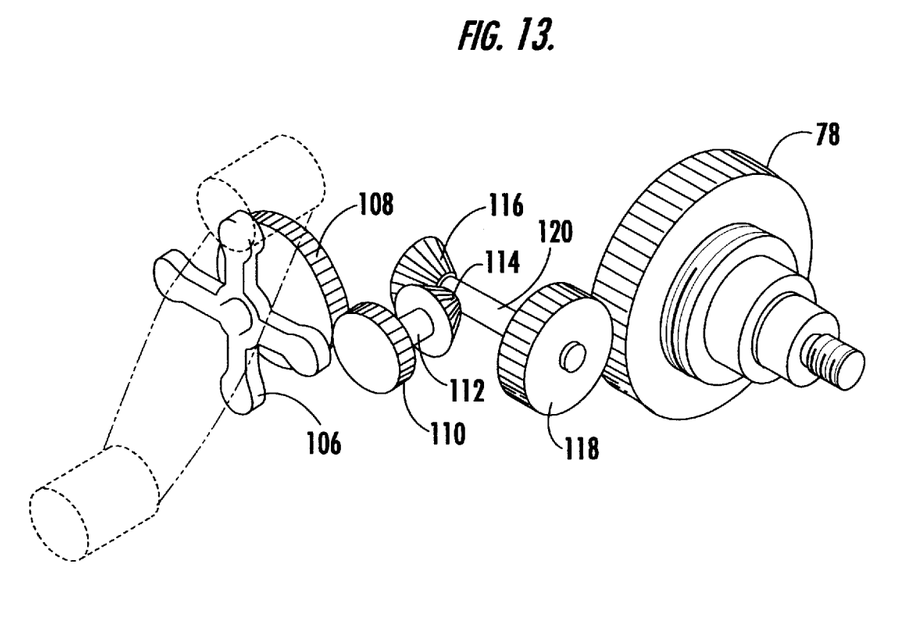
FIG. 13 is a schematic diagram of another embodiment of the gear drag arrangement.

FIG. 13 illustrates an alternative gear train arrangement which may be used with a drag mechanism as described above. In this case, however, a star-type thumb wheel 106 is mounted on a shaft coaxial with the cross shaft which carries the crank handle. A spur gear 108 is attached to the posterior side of thumb wheel 106, as shown. Spur gear 108 engages another spur gear 110 protruding from the reel's frame. Spur gear 110 is located at one end of a shaft 112, the other end of which carries a bevel gear 114 (which is located inside the reel's housing). Bevel gear 114 engages a second bevel gear 116 rigidly connected to a spur gear 118. In this case, for example, bevel gear 116 and spur gear 118 are interconnected by a rigid shaft 120. Spur gear 118, in turn, engages gear nut 78 to produce axial movement thereof in the manner described above.

While preferred embodiments of the invention have been shown and described, modifications and variations may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention as further described in such appended claims.

What is claimed is:

1. A spincast fishing reel comprising:
   a reel frame including a spool support portion;
   a normally nonrotatable line spool mounted on said spool support portion of said reel frame;
   a pickup head rotatable with respect to said line spool such that rotation of said pickup head will cause fishing line to be wound onto said line spool, said pickup head including at least one pickup pin;
   a closed-face cover connected to said reel frame to enclose said line spool and said pickup head, said cover including a forward opening therein through which said fishing line extends; and
   said reel frame including an annular shroud element located inside of said cover and being separate therefrom so as to remain fixed with respect to said reel frame when said cover is removed, said annular shroud element surrounding said line spool and having an inner diameter no less than an outer diameter of said pickup head to facilitate engagement of said fishing line by said pickup head.

2. A spincast fishing reel as set forth in claim 1, wherein said annular shroud element is a detachable component of said reel frame.

3. A spincast fishing reel as set forth in claim 2, wherein said reel frame includes a securing mechanism by which said annular shroud element is detachably connected.

4. A spincast fishing reel as set forth in claim 3, wherein said securing mechanism comprises at least one lug and slot combination.

5. A spincast fishing reel as in claim 1, wherein said annular shroud element is configured to allow the fishing line to be viewed on the line spool.

6. A spincast fishing reel as set forth in claim 1, wherein a forward edge of said annular shroud element is located axially adjacent to said at least one pickup pin when said fishing line is being wound onto said line spool.

7. A spincast fishing reel as set forth in claim 1, wherein said pickup head is rotationally actuated by rotation of a manual crank handle.

8. A spincast fishing reel as set forth in claim 7, wherein said reel frame includes an attachment foot for attaching said reel to a fishing rod.

9. A spincast fishing reel comprising:

a reel frame including a spool support portion;

a normally nonrotatable line spool mounted on said spool support portion of said reel frame;

a pickup head rotatable with respect to said line spool such that rotation of said pickup head will cause fishing line to be wound onto said line spool;

a closed-face cover connected to said reel frame to enclose said line spool and said pickup head, said cover including a forward opening therein through which said fishing line extends; and said reel frame including an annular shroud element located inside of said cover, said annular shroud element being at least partially transparent so as to allow the fishing line to be viewed on the line spool, said annular shroud element surrounding said line spool and having an inner diameter no less than an outer diameter of said pickup head to facilitate engagement of said fishing line by said pickup head.

10. A spincast fishing reel comprising:

a reel frame including a spool support portion;

a normally nonrotatable line spool mounted on said spool support portion of said reel frame;

a pickup head rotatable with respect to said line spool such that rotation of said pickup head will cause fishing line to be wound onto said line spool, said pickup head including at least one pickup pin;

a closed-face cover connected to said reel frame to enclose said line spool and said pickup head, said cover including a forward opening therein through which said fishing line extends;

said reel frame including an annular shroud element located inside of said cover, said annular shroud element surrounding said line spool and having an inner diameter no less than an outer diameter of said pickup head to facilitate engagement of said fishing line by said pickup head; and said annular shroud element being configured such that a forward edge thereof will be located axially adjacent to said at least one pickup pin when said fishing line is being would onto said line spool, said annular shroud element being further configured such that an inner diameter thereof at said forward edge will be no greater than the radial extent of said at least one pickup pin.

11. A spincast fishing reel comprising:

a normally nonrotatable line spool;

a pickup head axially and rotatably movable with respect to said line spool, said pickup head including at least one pickup pin;

a crank handle operatively associated with said pickup head such that manual rotation of said crank handle causes rotation of said pickup head; and an annular shroud element at least partially surrounding an outer circumferential surface of said pickup head when fishing line is being wound onto said line spool such that said fishing line will travel between said pickup head and said shroud element, said annular shroud element being configured such that an inner diameter thereof at said forward edge will be no greater than the radial extent of said at least one pickup pin.

12. A spincast fishing reel as set forth in claim 11, wherein a forward edge of said annular shroud element is located axially adjacent to said at least one pickup pin when said fishing line is being wound onto said line spool.

13. A spincast fishing reel as set forth in claim 11, wherein said annular shroud element is configured to allow the fishing line to be viewed on the line spool.

14. A spincast fishing reel as set forth in claim 11, having a reel frame defining a generally circular frame wall, said annular shroud element being a unitary extension of said reel frame.

15. A spincast fishing reel as set forth in claim 11, wherein said annular shroud element is a detachable component of said reel frame.

16. A spincast fishing reel as set forth in claim 15, wherein said reel frame includes a securing mechanism by which said annular shroud element is detachably connected.

17. A spincast fishing reel as in claim 11, wherein said reel frame includes an attachment foot for attaching said reel to a fishing rod.

18. A spincast fishing reel comprising:

a normally nonrotatable line spool;

a pickup head axially and rotatably movable with respect to said line spool, said pickup head including at least one pickup pin;

a crank handle operatively associated with said pickup head such that manual rotation of said crank handle causes rotation of said pickup head;

an annular shroud element at least partially surrounding an outer circumferential surface of said pickup head when fishing line is being wound onto said line spool such that said fishing line will travel between said pickup head and said shroud element; and said annular shroud element being at least partially transparent so as to allow said fishing line to be viewed on the line spool.

19. A spincast fishing reel comprising:

a reel frame defining a generally circular frame wall, said reel frame including a spool support hub for mounting a line spool containing fishing line in a normally nonrotatable fashion;

a pickup head axially and rotatably movable with respect to said line spool, said pickup head including at least one pickup pin;

a crank handle operatively associated with said pickup head such that manual rotation of said crank handle causes rotation of said pickup head;

an annular shroud element configured having an inner diameter at a forward edge thereof no greater than a radial extent of said at least one pickup pin such that said fishing line will travel between said pickup head and said shroud element when said fishing line is being wound onto the line spool;

a closed-face cover connected to said reel frame to enclose said line spool and said pickup head, said cover including a forward opening therein through which said fishing line extends; and a rear cover connected to said reel frame, said rear cover having a pivotal thumb button mounted thereon, said thumb button being actuatable to allow casting of said fishing line.

* * * * *